United States Patent
Lin et al.

(10) Patent No.: US 9,014,270 B2
(45) Date of Patent: Apr. 21, 2015

(54) METHOD, APPARATUS AND SYSTEM FOR RAPID MOTION SEARCH APPLIED IN TEMPLATE SWITCHING

(75) Inventors: Sixin Lin, Shenzhen (CN); Lianhuan Xiong, Shenzhen (CN); Yingjia Liu, Shenzhen (CN); Steffen Kamp, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 883 days.

(21) Appl. No.: 13/073,727

(22) Filed: Mar. 28, 2011

(65) Prior Publication Data

US 2011/0188579 A1 Aug. 4, 2011

Related U.S. Application Data

(63) Continuation of application No. PCT/CN2009/074176, filed on Sep. 24, 2009.

(30) Foreign Application Priority Data

Sep. 28, 2008 (CN) .......................... 2008 1 0223272

(51) Int. Cl.
*H04B 1/66* (2006.01)
*H04N 19/513* (2014.01)
(Continued)

(52) U.S. Cl.
CPC .............. *H04N 19/513* (2013.01); *H04N 19/56* (2013.01)

(58) Field of Classification Search
CPC .................... H04N 19/0066; H04N 19/00684
USPC ............... 348/699, 413.1; 382/238, 233, 236; 375/240.01–240.29
See application file for complete search history.

(56) References Cited

U.S. PATENT DOCUMENTS 8,000,386 B2 * 8/2011 Nicolas ..................... 375/240
2002/0009144 A1 * 1/2002 Ishihara et al. ......... 375/240.16
(Continued)

FOREIGN PATENT DOCUMENTS

| CN | 1381145 A | 11/2002 |
|---|---|---|
| CN | 1925614 A | 3/2007 |

(Continued)

OTHER PUBLICATIONS $2^{nd}$ Office Action in corresponding Chinese Application No. 200810223272.2 (Feb. 6, 2012).
(Continued)

*Primary Examiner* — Behrooz Senfi
(74) *Attorney, Agent, or Firm* — Leydig, Voit & Mayer, Ltd.

(57) ABSTRACT

A method, an apparatus and a system for a rapid motion search applied in template matching are disclosed. The method includes: selecting motion vectors of blocks related to a current block as candidate motion vectors of the current block; after the uniqueness of a series of the candidate motion vectors of the current block is maintained, calculating the cost function of the candidate motion vectors in a corresponding template area of a reference frame, and obtaining the motion vector of the best matching template from the candidate motion vectors of the current block. In the embodiments of the present invention, there is no need to determine a large search range and no need to determine the corresponding search path template, and it is only necessary to perform a search in a smaller range.

15 Claims, 5 Drawing Sheets

(51) Int. Cl.
*H04N 19/56* (2014.01)
*G06K 9/36* (2006.01)

(56) References Cited

U.S. PATENT DOCUMENTS

| | | | |
|---|---|---|---|
| 2008/0285651 A1* | 11/2008 | Au et al. | 375/240.16 |
| 2009/0003443 A1* | 1/2009 | Guo et al. | 375/240.13 |
| 2009/0232215 A1* | 9/2009 | Park et al. | 375/240.16 |
| 2011/0261882 A1* | 10/2011 | Zheng et al. | 375/240.13 |
| 2011/0293015 A1* | 12/2011 | Nicolas | 375/240.16 |

FOREIGN PATENT DOCUMENTS

| | | |
|---|---|---|
| CN | 101123728 A | 2/2008 |
| CN | 101198064 A | 6/2008 |

OTHER PUBLICATIONS

Extended European Search Report in corresponding European Patent Application No. 09815611.0 (Apr. 12, 2012).
Chalidabhongse et al., "Fast Motion Vector Estimation Using Multiresolution-Spatio-Temporal Correlations," IEEE Transaction on Circuits and Systems for Video Technology, Jun. 1997, vol. 7, No. 3, IEEE, Washington, D.C.
Chimienti et al., "A Complexity-Bounded Motion Estimation Algorithm," IEEE Transactions on Image Processing, Apr. 2002, vol. 11, No. 4, IEEE, Washington, D.C.
Kamp et al., "Improving AVC Compression Performance by Template Matching With Decoder-Side Motion Vector Derivation," IOS/IEC JTC1/SC29/WG11, MPEG2008/M15375, Apr. 25, 2008, International Organization for Standardization, Geneva, Switzerland.
Kamp et al., "Fast Decoder Side Motion Vector Derivation with Candidate Scaling," ISO/IEC JTC1/SC29/WG11, Meeting 31, Jan. 2009, International Organization for Standardization, Geneva, Switzerland.
Kamp et al., "Fact Decoder Motion Vector Derivation," VCEG-AJ18, VCEG Meeting, Oct. 2008, International Telecommunications Union, Geneva, Switzerland.
Kamp et al., "Multi-Hypothesis Prediction with Decoder Side Motion Vector Derivation," JVT-AA040, Apr. 2008, International Telecommunications Union, Geneva, Switzerland.
Kamp et al., "Decoder Side Motion Vector Derivation with Multiple Reference Pictures," VCEG Meeting 34, Jan. 2008, International Telecommunications Union, Geneva, Switzerland.
Kamp et al., "Decoder Side Motion Vector Derivation," ISO/IEC JTC1/SC29/WG11, MPEG2007/M14917, Oct. 2007, International Organization for Standardization, Geneva, Switzerland.
Nisar et al., "An Adaptive Block Motion Estimation Algorithm Based on Spatio-Temporal Correlation," Consumer Electronics (ICCE), IEEE International Conference, Jan. 2006, IEEE, Washington, D.C.
Richardson, "H.264/MPEG4 Part 10," H.264/MPEG4 Video Compression: Video Coding Next Generation Multimedia, Aug. 2003, John Wiley & Sons, Ltd., Hoboken, NJ.
Written Opinion of the International Searching Authority in corresponding PCT Application No. PCT/CN2009/074176 (Dec. 31, 2009).
1$^{st}$ Office Action in corresponding Chinese Application No. 200810223272.2 (Nov. 12, 2010).
Kamp et al., "VCEG-AH15—Decoder Side Motion Vector Derivation with Multiple Reference Pictures," ITU —Telecommunications Standardization Sector Study Group 16 Question 6 Video Coding Experts Group (VCEG), Jan. 12-13, 2008, International Telecommunication Union, Antalya, Turkey.
Kamp et al., "VCEG-AH15r1—Decoder Side Motion Vector Derivation with Multiple Reference Pictures," ITU—Telecommunications Standardization Sector Study Group 16 Question 6 Video Coding Experts Group (VCEG), Jan. 12-13, 2008, International Telecommunication Union, Antalya, Turkey.
Kamp et al., "Decoder-side MV derivation with multiple reference pictures," VCEG Meeting, Jan. 2008, RWTH Aachen University, Aachen, Germany.
International Search Report in corresponding PCT Application No. PCT/CN2009/074176 (Dec. 31, 2009).
De Haan et al., "True-Motion Estimation with 3-D Recursive Search Block Matching," IEEE Transactions on Circuits and Systems for Video Technology, vol. 3, No. 5, pp. 368-379, Institute of Electrical and Electronics Engineers, New York, New York (Oct. 1993).

* cited by examiner

METHOD, APPARATUS AND SYSTEM FOR RAPID MOTION SEARCH APPLIED IN TEMPLATE SWITCHING

CROSS-REFERENCE TO RELATED APPLICATIONS

This application is a continuation of International Application No.PCT/CN2009/074176, filed on Sep. 24, 2009, which claims priority to Chinese Patent Application No. 200810223272.2, filed on Sep. 28, 2008, both of which are hereby incorporated by reference in their entireties.

FIELD OF THE INVENTION

The invention relates to an encoding technology, and in particular, to a method, anapparatus and a system for a rapid motion search applied in template matching.

BACKGROUND OF THE INVENTION

In the video encoding and decoding process, the inter-frame motion compensation prediction technology plays an important role in improving the encoding and decodingefficiency. The inter-frame motion compensation prediction technology refers to that: during the encoding and decoding process, a motion compensation is performed by using a motion vector obtained by a search, to implement the encoding and decoding operations.

At present, a motion vector search method adopted during motion vector estimation at a decoding end is to perform a search on the integral points in a limited range and a fine search on the sub-pixels around the found best integral point, to determine the corresponding motion vectors. For example, as shown in FIG. 1, firstly, eight half pixels 1 to 8 around are searched, and then, eight ¼ pixels a to h around the selected best half pixels are searched, to implement the search of the corresponding motion vectors. Alternatively, another motion vector search method, called three-step search (TSS), may be used. As shown in FIG. 2, the method is to select a search path according to a Sudoku search template in a certain search range. Specifically, the method includes: first, searching for the position matching degrees of nine path points in a larger range according to a search path template, selecting the best matching point; then, looking for and finding the best matching point of the nine path points in a smaller range according to the same search path template; and finally using the motion vector of the point as the motion vector obtained by the search.

The inventor finds at least the following problems in the prior art during the implementation of the invention.

The two motion vector search methods both have the following problems: the search range is large, and the search process is complex, lowering the encoding and decoding efficiency during encoding and decoding.

SUMMARY OF THE INVENTION

Embodiments of the present invention provide a method, an apparatus and a system for a rapid motion search applied in template matching to effectively reduce the complexity of searching for motion vectors and to increase the encoding and decoding efficiency.

A method for a rapid motion search applied in template matching includes:

selecting motion vectors of blocks related to a current block as candidate motion vectors of the current block;

calculating the distortion of the candidate motion vectors in a corresponding template area of a reference frame; and obtaining, according to the distortion, a minimally distorted candidate motion vector in the candidate motion vectors of the current block as a motion vector of the current block.

A method for a rapid motion search applied in template matching includes:

selecting motion vectors of blocks related to a current block as candidate motion vectors of the current block;

calculating the distortion of the candidate motion vectors in a corresponding template area of a reference frame; and obtaining, according to the distortion, a minimally distorted motion vector in the candidate motion vectors of the current block.

An encoding method includes:

searching for and determining motion vectors of a current block by using the rapid motion search method applied in template matching; and encoding the current block according to the motion vectors of the current block.

A decoding method includes:

searching for and determining motion vectors of a current block by using the rapid motion search method applied in template matching; and decoding the current block according to the motion vectors of the current block.

An apparatus for a rapid motion search applied in template matching includes:

a candidate motion vector determining unit configured to select motion vectors of blocks related to a current block as candidate motion vectors of the current block; and a motion vector searching unit configured to calculate the distortion of the candidate motion vectors in a corresponding template area of a reference frame and obtain a minimally distorted candidate motion vector in the candidate motion vectors of the current block as a motion vector of the current block.

An apparatus for a rapid motion search applied in template matching includes:

a candidate motion vector determining unit configured to select motion vectors of blocks related to a current block as candidate motion vectors of the current block; and a motion vector searching unit configured to calculate the distortion of the candidate motion vectors in a corresponding template area of a reference frame and obtain a minimally distorted candidate motion vector in the candidate motion vectors of the current block.

An encoder includes the above-mentioned apparatus for a rapid motion search applied in template matching, and an encoding unit configured to encode the current block, according to the motion vector of the current block determined by the preceding apparatus.

A decoder includes the above-mentioned apparatus for a rapid motion search applied in template matching, and a decoding unit configured to decode the current block according to the motion vector of the current block determined by the preceding apparatus.

An encoding and decoding system includes the above-mentioned encoder, and the above-mentioned decoder that communicates with above-mentioned the encoder.

It can be seen from the technical solution provided by embodiments of the present invention that, there is no need to determine a big search range and no need to determine the corresponding search path template, and it is only necessary to perform a search in a smaller range, so that the complexity of searching for motion vectors may be effectively reduced, thus increasing the encoding and decoding efficiency.

BRIEF DESCRIPTION OF THE DRAWINGS

To explain the technical solution of the present invention more clearly, the following outlines the accompanying drawings involved in the description of the embodiments of the present invention. Obviously, the drawings are illustrative only and not exhaustive, and those skilled in the art may obtain other drawings according to the drawings without any creative effort.

DETAILED DESCRIPTION OF THE EMBODIMENTS

Figures 1, 2:
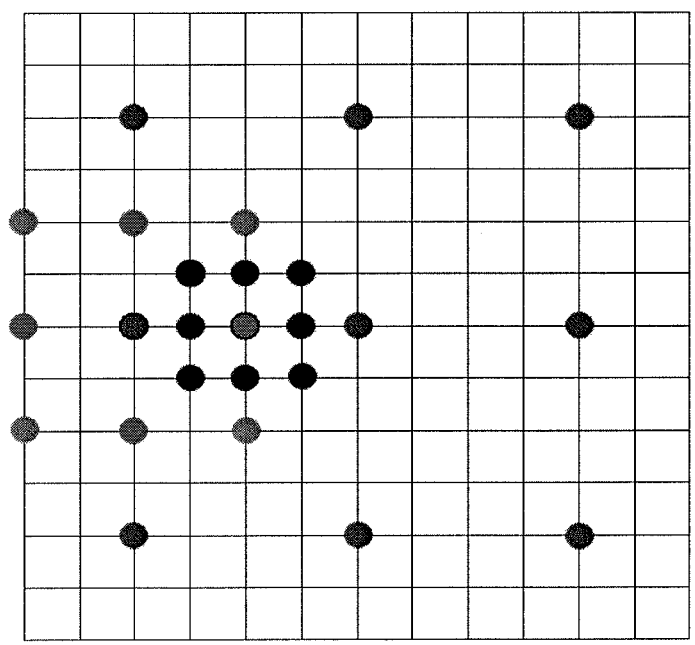
FIG. 1 is a schematic diagram illustrating search method 1 in the prior art.
FIG. 2 is a schematic diagram illustrating search method 2 in the prior art.

The technical solution of the present invention is described below with reference to some exemplary embodiments and accompanying drawings. Evidently, the embodiments described below are exemplary only and not exhaustive. Other embodiments derived by those skilled in the art on the basis of the embodiments herein without any creative effort fall within the protection scope of the present invention.

The process of searching for motion vectors according to embodiments of the present invention is to position and match the motion vectors in a reference frame of the current video content as the corresponding motion vectors to reduce the complexity of the search process, thus rapidly searching for and determining the matching motion vectors, so that the encoding and decoding efficiency may be increased and that the encoding and decoding performance may be guaranteed or improved.

The embodiments of the present invention may be applied at a decoding end for the corresponding decoding operations, or applied at an encoding end for the corresponding encoding operations, or applied at the encoding and decoding ends simultaneously.

In the specific process of applying the embodiments of the present invention, if the embodiments of the present invention are applied at the encoding end, the corresponding motion vectors may be written into a bit stream or not. If the corresponding motion vectors are not written into the bit stream, the motion vectors are searched at the decoding end by using the same motion vector search method.

According to the motion vector search solution provided by an embodiment of the present invention, firstly, motion vectors of blocks related to a current block are selected as candidate motion vectors of the current block, and then, the best matching candidate motion vector in the candidate motion vectors of the current block is selected as a motion vector of the current block. That is, the solution is to firstly calculate the distortion of the candidate motion vectors in a corresponding template area of a reference frame, and obtain, according to the determined distortion, a minimally distorted candidate motion vector in the candidate motion vectors of the current block as a motion vector of the current block. For example, the sum of absolute differences or the sum of squared differences of pixel values of the candidate motion vectors of the current block between the template area of the current block and the corresponding template area of the reference frame may be calculated, and the candidate motion vector having the minimum sum of absolute differences or the minimum sum of squared differences of pixel values may be selected as the best matching candidate motion vector, namely, the motion vector of the current block.

Alternatively, the embodiments of the present invention may also use, according to the distortion, the minimally distorted candidate motion vector obtained in the candidate motion vectors of the current block as a predicted value of the motion vector of the current block, and calculate the motion vector of the current block according to the predicted value. The same description is also applicable to the related contents below.

During the processing above, the blocks related to the current block may include at least one of:

(1) blocks spatially related to the current block, where the spatially related blocks refer to the blocks adjacent to the current block, such as a left block, an upper-left block, an upper block, or an upper-right block; and (2) blocks temporally related to the current block, where the temporally related blocks refer to the blocks corresponding to or adjacent to the current block in the reference frame.

Optionally, motion vectors as the candidate motion vectors of the current block are different from each other, and the candidate motion vectors may include one or more of:

(1) the motion vector corresponding to a single related block, namely, the motion vector corresponding to one of the related blocks used as the corresponding candidate motion vector directly;

(2) one or more calculated motion vectors corresponding to one or more related blocks and used as the corresponding candidate motion vectors, where, a scaling calculation for the motion vectors of one or more related blocks according to the reference image indexes of the current block and reference image indexes of the related blocks, a weighted average calculation for the motion vectors of multiple related blocks, a shift calculation for the motion vectors of one or more related blocks, or a median calculation for the motion vectors of multiple related blocks may be performed; and, if multiple calculations are required, each calculation may use the same calculation method or different calculation methods; and (3) one motion vector selected in the multiple motion vectors corresponding to multiple related blocks to be used as the corresponding candidate motion vector.

Figure 3:
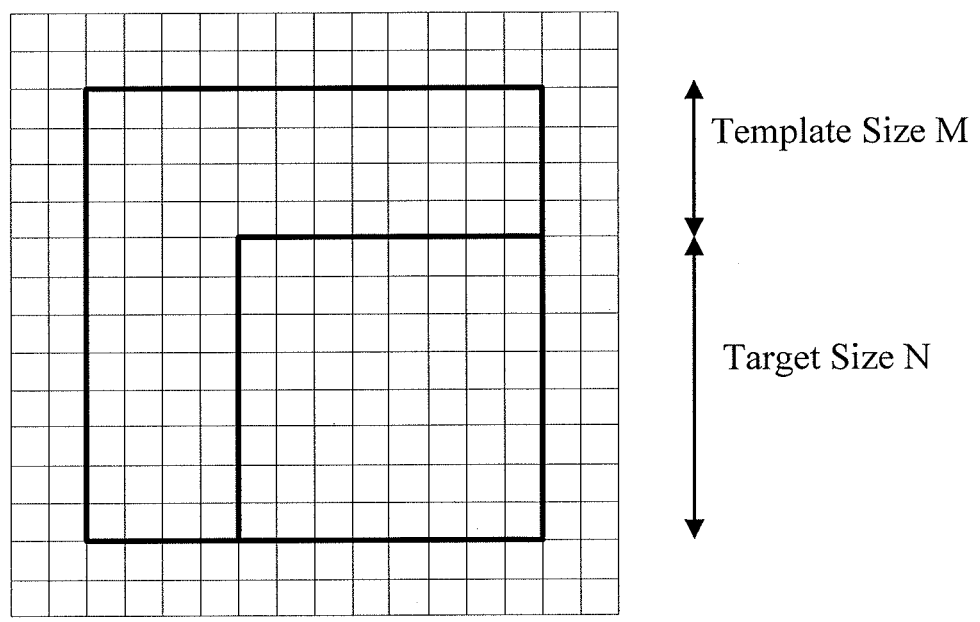
FIG. 3 is a schematic diagram showing a target area and an L-shaped template according to an embodiment of the present invention.

Taking FIG. 3 as an example, embodiments of the present invention are to calculate a cost function (namely, distortion magnitude) by a corresponding offset template block (L-shaped template in FIG. 3) in the reference frame to estimate the motion vector of the current block in a target area. The corresponding target area (square area in FIG. 3) may be a macro block or a sub-block of the macro block, such as 16×8, 8×16 and 8×8 pixel blocks, and the cost function is the sum of absolute differences of the pixel values between the template area of the current block and the corresponding area in the reference frame, or other cost functions may be used, such as the sum of squared differences of pixel values between the template area of the current block and the corresponding area in the reference frame. The best matching motion vector of the current block may be determined according to the minimum cost value.

The following describes specific implementations of the embodiments of the present invention in detail on the basis of the drawings.

Figure 4:
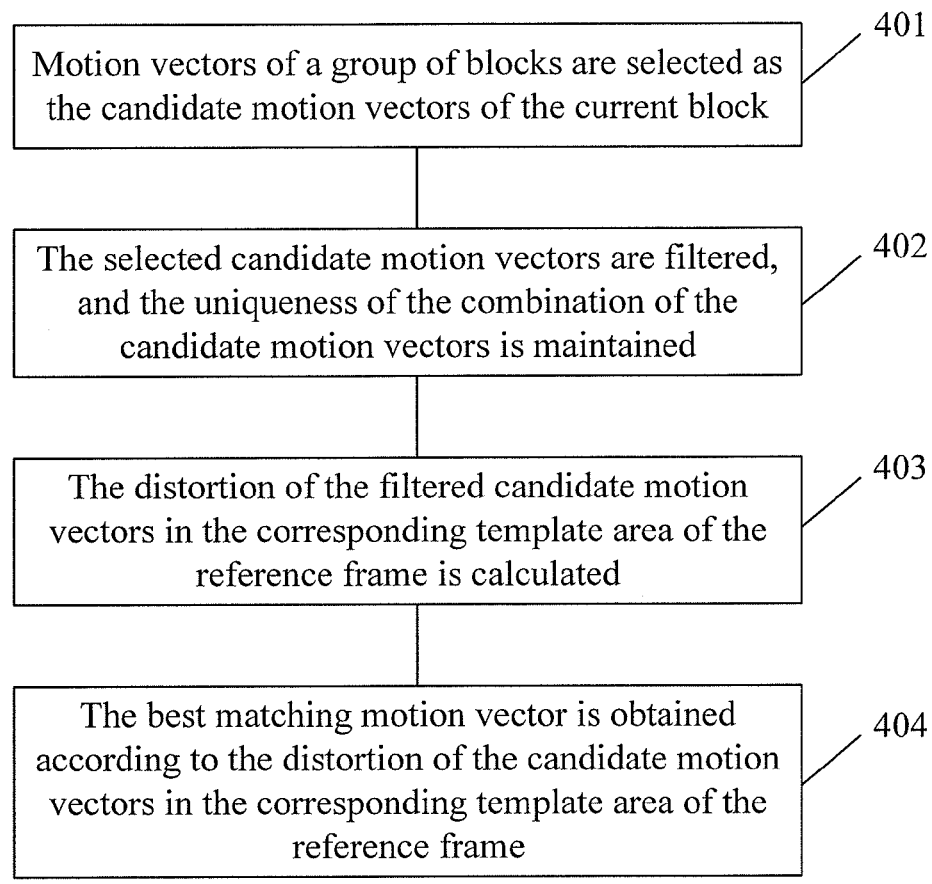
FIG. 4 is a schematic diagram illustrating a process of searching for a motion vector according to an embodiment of the present invention.

As shown in FIG. 4, the specific implementation of searching for motion vectors in the embodiments of the present invention includes the following steps.

Step 401: The motion vectors of a group of points (blocks) in the motion vectors of other points are selected as the candidate motion vectors according to the relevance between other points (other blocks) and the current block.

The specific selection may be: using the motion vectors of decoded blocks around the current block, or the motion vectors of other blocks derived from the motion vectors of decoded blocks as the candidate motion vectors.

Figure 5:
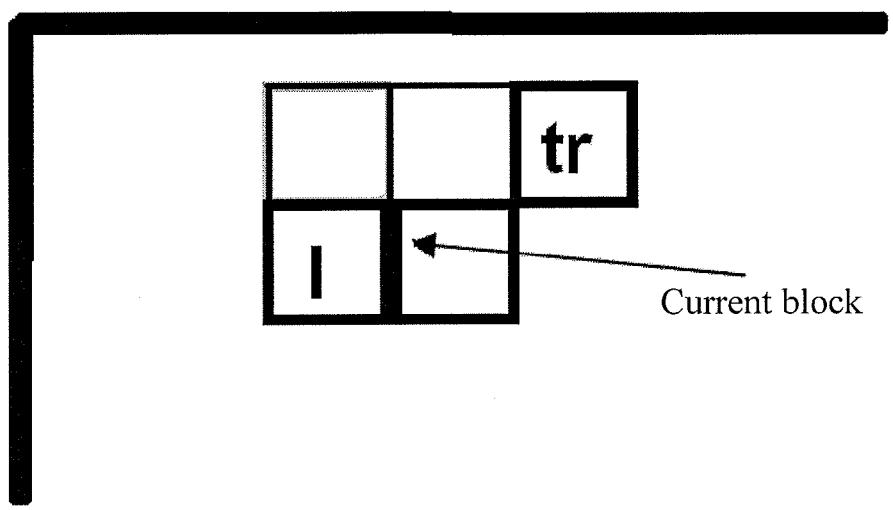
FIG. 5 is a schematic diagram showing blocks related to a current block according to an embodiment of the present invention.

As shown in FIG. 5, the motion vectors of a group of blocks with different motion vectors may be selected from the blocks, such as a left block, an upper-left block, an upper block and an upper-right block related to the current block, as the corresponding candidate motion vectors. For example, the motion vectors of the left and upper-right blocks of the current block may be selected as the candidate motion vectors; during the selection, the motion vectors of each block must be different from each other, and, if multiple motion vectors are the same, one of them is used as the candidate motion vector.

Or, a motion vector prediction (MVP) obtained from the median calculation by a motion vector predictor in the H264/AVC may be used as the candidate motion vector of the current block. The calculation of the MVP may be as follows: Assuming that the motion vectors of the left block, the right block and the upper-right block of the current block are MVA, MVB and MVC respectively, the three values are compared with one another, and the median of them is used as the MVP (for example, if MVA<MVB<MVC, the MVB is selected as the MVP).

Or, the motion vectors of the blocks in the same position of the current block in a decoded image may be used as the candidate motion vectors of the current block.

Or, when a multi-reference frame is used for encoding, the motion vectors obtained from the proportional scaling according to the reference image indexes of the candidate motion vectors and reference image indexes of a current reference image may be used as the candidate motion vectors of the current block. For example, assuming the candidate motion vector is MVp, the corresponding reference image index is refIdxp, the reference image index of the current reference image is refIdxX, and the motion vector of the current block corresponding to the current reference image obtained after the scaling is MVX, then, $$MVX = MVp \times (refIdxX/refIdxp) \quad (1)$$

Or, the candidate motion vectors of the current block may be a combination of other candidate motion vectors. For example, the corresponding candidate motion vectors may be the motion vectors scaled by the equation (1) plus a certain offset value, namely, MVX=MVp1×(refIdxX/refIdxp1)+offset, where the offset is an offset value, and the corresponding offset value may be the difference of predetermined constant values or other candidate motion vectors.

Or, the weighted average value of other candidate motion vectors may be used as the corresponding candidate motion vectors of the current block, for example, by the following equation:

$$MVX = \left(\left(\sum_{n=0}^{N-1} \alpha_n \cdot MV_{Pn}\right) + r\right) >> \log_2 A; \quad (2)$$

where MVX is the obtained candidate motion vector of the current block after the weighted average, N represents N weighted factors, $a_n$ represents integral weighted factors generated according to the cost function, A is a number equal to the power of 2, such as $A=2^k$, $k \in$ Integers, and is also the sum of all the integral weighted factors, namely, $$A = \sum_{n=0}^{N-1} \alpha_n, \; MV_{Pn}$$

is candidate motion vectors, and r represents a rounding-off error, which may be predetermined, and usually 0 or $$\frac{A}{2}.$$

Step 402: After the determination of a group of candidate motion vectors in step 401, the corresponding candidate motion vectors are further filtered to determine the final candidate motion vector in a candidate motion vector queue.

During the filtering, it is necessary to only reserve one of the selected candidate motion vectors if they are the same, and remove the rest from the candidate motion vector queue to guarantee the uniqueness of each candidate motion vector.

Optionally, the corresponding candidate motion vectors may be further filtered by using other predetermined rules. For example, if a block where a certain candidate motion vector is located is an intra-frame block, the block may be removed from the candidate motion vector queue, considering the poor availability.

After the corresponding filtering operations and the final determination of the candidate motion vectors, the best matching motion vector in the candidate motion vector queue may be selected as the motion vector of the current template, namely, the motion vector of the current block. The process includes the following steps.

Step 403: The distortion of the filtered candidate motion vectors in the corresponding template area of the reference frame is calculated so as to select the best matching motion vector according to the distortion.

Step 404: According to the distortion result of the candidate motion vectors in the corresponding template area of the reference frame, the best matching (minimally distorted) motion vector is obtained as the motion vector of the current block or the predicted value of the motion vector of the current block.

Figure 6:
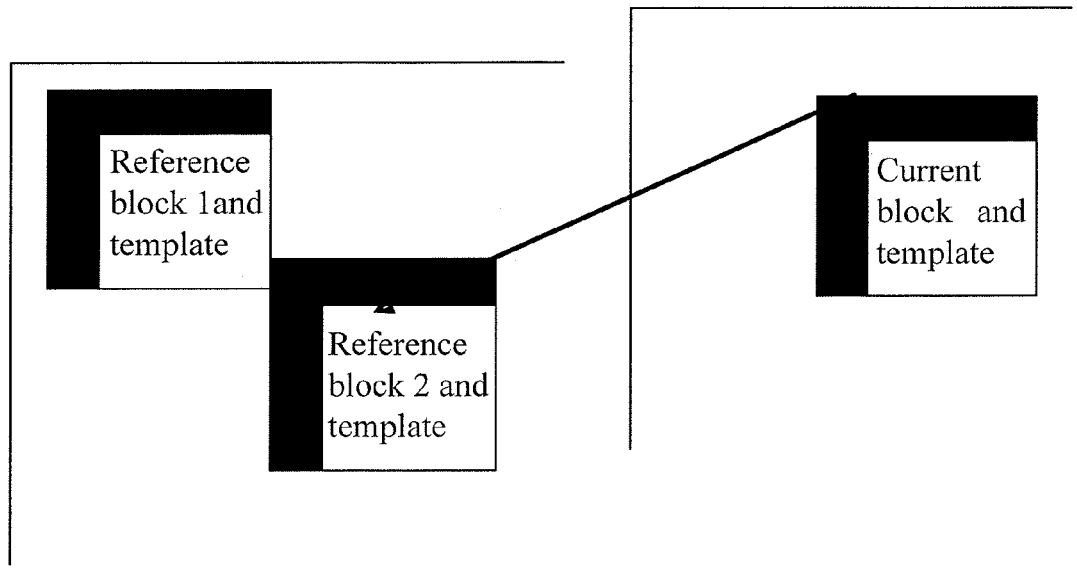
FIG. 6 is a schematic diagram illustrating a search process in template matching according to an embodiment of the present invention.

Specifically, the unique candidate motion vectors in the candidate motion vector queue may be used to calculate the matching costs of the corresponding template blocks and the current template block in turn obtained by moving offset values of the motion vectors in the reference frame, for example, by calculating the sum of absolute differences (SAD) or the sum of squared differences of pixel values (USSD); and then, the candidate motion vector with the minimum matching cost (minimum distortion) in the candidate motion vector queue is selected as the motion vector of the current template according to the calculated matching costs. For example, as shown in FIG. 6, the templates of the candidate motion vectors obtained by step 2 in the corresponding positions of the reference frame are reference blocks 1 and 2, and then, the reference block 2 is determined as the best matching block according to the calculation of matching costs, so that the candidate motion vectors of the reference block 2 corresponding to the candidate motion vector queue are motion vectors.

Optionally, after steps 401 to 404 are performed and the corresponding motion vectors of the current block are obtained, whether to perform a sub-pixel search or not may be further adaptively selected. For example, if the found motion vectors of the current block are in the sub-pixel accuracy, no sub-pixel fine search is required; otherwise, the corresponding sub-pixel search is performed to determine the final motion vector of the current block.

The rapid motion search solution provided by the embodiments of the present invention may rapidly and accurately search for the motion vectors of the current block during the encoding and decoding so as to effectively improve the encoding and decoding efficiency and performance of an encoding and decoding system.

Figure 7:
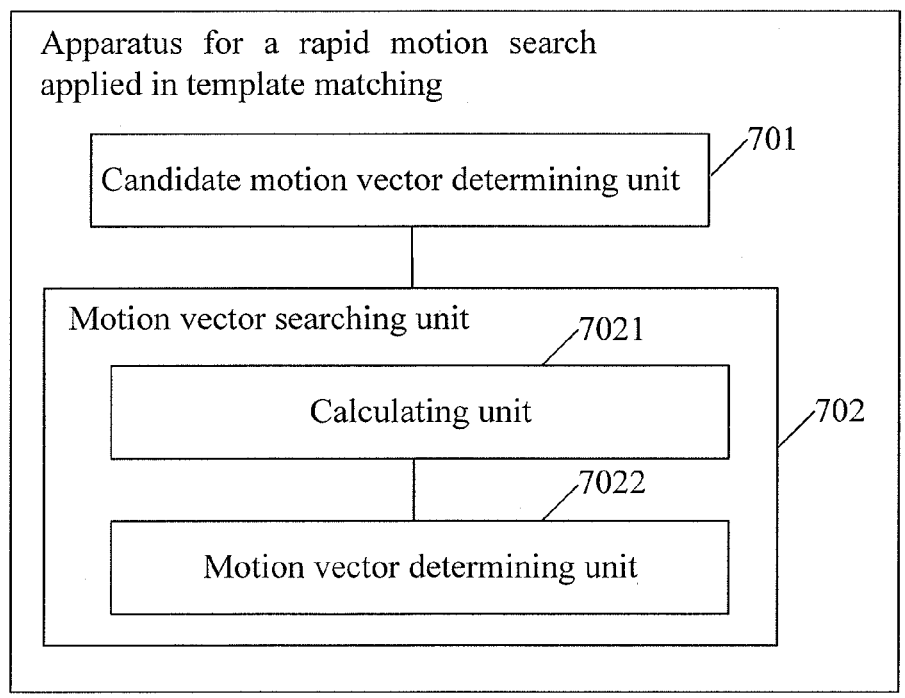
FIG. 7 is a schematic diagram showing a structure of an apparatus provided by an embodiment of the present invention.

An embodiment of the present invention further provides a motion vector searching apparatus, the specific structure of which is shown in FIG. 7 and may include a candidate motion vector determining unit 701 and a motion vector searching unit 702. The candidate motion vector determining unit 701 is configured to select motion vectors of blocks related to a current block as candidate motion vectors of the current block.

Optionally, the blocks related to the current block may include at least one of the following:

blocks spatially related to the current block, where the spatially related blocks refer to the blocks adjacent to the current block; and blocks temporally related to the current block, where the temporally related blocks refer to the blocks corresponding to or adjacent to the current block in the reference frame.

Optionally, the motion vectors as the candidate motion vectors of the current block are different from each other, and the corresponding candidate motion vectors selected by the candidate motion vector determining unit 701 may specifically include at least one of:

the motion vector corresponding to a single related block;

one or more calculated motion vectors corresponding to one or more related blocks and used as the corresponding candidate motion vectors, where, a scaling calculation for the motion vectors of one or more related blocks according to the reference image indexes of the current block and reference image indexes of the related blocks, a weighted average calculation for the motion vectors of multiple related blocks, a shift calculation for the motion vectors of one or more related blocks, or a median calculation for the motion vectors of multiple related blocks may be performed; and, if multiple calculations for multiple related blocks are required, part or all of the multiple calculation methods above may be simultaneously applied in the calculation process to implement the corresponding multiple calculations, namely, the corresponding multiple calculations may be implemented by using different methods; and a motion vector selected from multiple motion vectors corresponding to the multiple related blocks.

The motion vector searching unit 702 is configured to select the best matching candidate motion vector in the candidate motion vectors of the current block determined by the candidate motion vector determining unit 701 as the motion vector of the current block, namely, to calculate the distortion of the candidate motion vectors in a corresponding template area of a reference frame and obtain a minimally distorted candidate motion vector in the candidate motion vectors of the current block as a motion vector of the current block.

The motion vector searching unit 702 may specifically include:

a calculating unit 7021 configured to calculate the sum of absolute differences or the sum of squared differences of pixel values of the candidate motion vectors of the current block between the template area of the current block and the corresponding template area of the reference frame; and a motion vector determining unit 7022 configured to select the candidate motion vector having the minimum sum of absolute differences or the minimum sum of squared differences of pixel values according to the calculation result of the calculating unit 7021.

Alternatively, the motion vector searching unit 702 is configured to calculate the distortion of the candidate motion vectors in a corresponding template area of a reference frame and obtain the minimally distorted candidate motion vector in the candidate motion vectors of the current block. The minimally distorted motion vector obtained by the motion vector searching unit 702 is used as the motion vector of the current block or the predicted value of the motion vector of the current block.

It should be noted that the preceding apparatus may be arranged at an encoding end or a decoding end. If the preceding apparatus is arranged at the encoding end, the corresponding motion vectors may be not carried and transferred in a bit stream, and the same motion vector search method is performed at the decoding end to search for the motion vectors.

Figure 8:
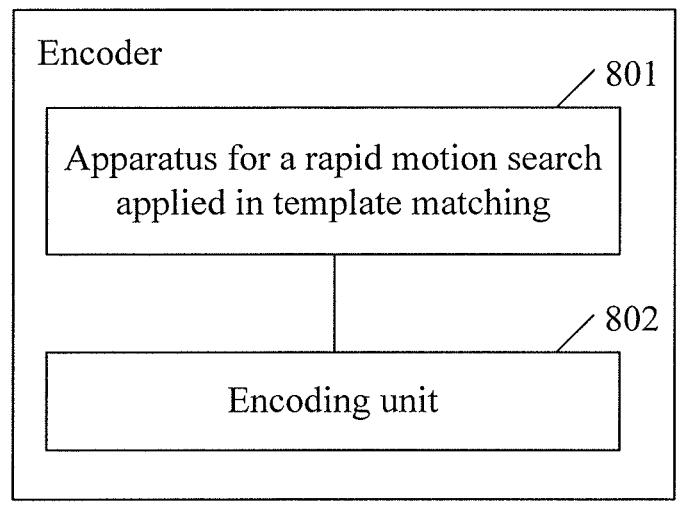
FIG. 8 is a schematic diagram showing a structure of an encoding apparatus provided by an embodiment of the present invention.

Specifically, an encoder provided by an embodiment of the present invention, as shown in FIG. 8, may include the preceding apparatus 801 for the rapid motion search applied in template matching, and an encoding unit 802 configured to encode the current block according to the motion vector of the current block determined by the preceding apparatus 801.

Figure 9:
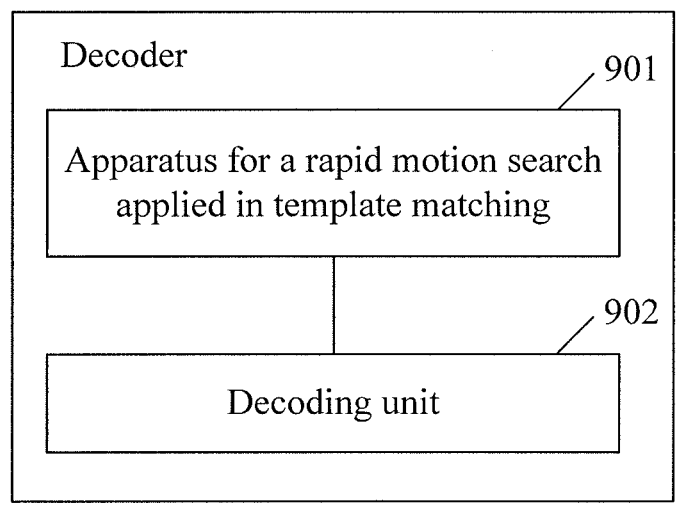
FIG. 9 is a schematic diagram showing a structure of a decoding apparatus provided by an embodiment of the present invention.

A decoder provided by an embodiment of the present invention, as shown in FIG. 9, may include the preceding apparatus 901 for the rapid motion search applied in template matching, and a decoding unit 902 configured to decode the current block according to the motion vector of the current block determined by the preceding apparatus 901.

An embodiment of the present invention further provides an encoding and decoding system including the encoder shown in FIG. 8 and the decoder shown in FIG. 9 that communicates with the encoder.

The implementations of the apparatus, encoder, decoder, and encoding and decoding system may conveniently and rapidly obtain the corresponding motion vectors of the current block during the encoding and decoding so as to effectively implement the corresponding motion compensation technologies, thus improving the encoding and decoding efficiency and performance of the encoder, the decoder, and the encoding and decoding system.

Those skilled in the art may understand that the implementation of all or some processes in the method embodiments above may be finished by a computer program instructing relevant hardware. The program may be stored in a computer readable storage medium. When executed, the program may include the processes of the method embodiments above. The storage medium may be a magnetic disk, a read only memory (ROM), a random access memory (RAM), or a compact disk-read only memory (CD-ROM).

In the embodiments of the present invention, there is no need to determine a big search range, so that the calculation of the template matching cost in the motion vector derivation algorithm at the encoding and decoding ends may be reduced, and the complexity of the motion vector derivation algorithm at the encoding and decoding ends is reduced to more conveniently and rapidly obtain the corresponding motion vectors. Meanwhile, the embodiments of the present invention may further maintain or improve the corresponding encoding and decoding performance by reserving sufficient candidate motion vectors.

The above are only some exemplary embodiments of the present invention, and the present invention is not limited thereto. It is apparent that those skilled in the art may make various modifications and variations without departing from the scope of the invention. The invention is intended to cover the modifications and variations provided that they fall within the scope of protection defined by the following claims or their equivalents.

The invention claimed is:

1. A method for conducting a rapid motion search for a current block within a current frame, using template matching, for motion compensation prediction of the current block with respect to a reference block in a reference frame, comprising:
   generating, for the current block, a set of candidate motion vectors from motion vectors of blocks related to the current block;
   calculating, by template matching for each one of the set of candidate motion vectors, a distortion value calculated from differences between pixel values in a template area for the current block and pixel values in a reference block template area within the reference frame, corresponding to a respective one of the candidate motion vectors, wherein each one of the set of candidate motion vectors specifies a displacement, of a position of the template area for the current block within the current frame, to render a position of the reference block template area within the reference frame to which corresponding pixel values of the template area for the current block are compared to calculate the distortion value for the one of the set of candidate motion vectors, and wherein the template area for the current block is a rotated L-shaped area bounded by a top edge and a left edge of the current block within the current frame, the calculating rendering a set of distortion values corresponding to respective ones of the set of candidate motion vectors; and
   obtaining, from the set of distortion values for the set of candidate motion vectors, a motion vector prediction for the current block, wherein the motion vector prediction for the current block corresponds to the respective one of the set of candidate motion vectors for which a minimum distortion value of the set of distortion values was rendered during the calculating.

2. The method according to claim 1, wherein the motion vectors of blocks related to the current block comprise motion vectors of at least one of the group consisting of:
   motion vectors of blocks spatially related to the current block, wherein the blocks spatially related to the current block are blocks adjacent to the current block; and
   motion vectors of blocks temporally related to the current block, wherein the blocks temporally related to the current block are blocks corresponding to or adjacent to the current block in the reference frame.

3. The method according to claim 1, wherein: the set of candidate motion vectors of the current block are different from each other, and the set of candidate motion vectors of the current block comprise at least one of:
   a motion vector corresponding to a single block related to the current block;
   motion vectors obtained by calculating one or more motion vectors corresponding to one or more blocks related to the current block; or
   a motion vector selected from multiple motion vectors corresponding to multiple blocks related to the current block.

4. The method according to claim 3, wherein the generating the set of candidate motion vectors comprises at least one of the group consisting of:
   performing a scaling calculation for the motion vectors of one or more blocks related to the current block according to reference image indexes of the current block and reference image indexes of the blocks related to the current block;
   performing a shift calculation for the motion vectors of one or more blocks related to the current block;
   performing a median calculation for the motion vectors of multiple blocks related to the current block; and
   performing a weighted average calculation for the motion vectors of multiple blocks related to the current block.

5. The method according to claim 1, wherein the calculating and the obtaining the motion vector for the current block comprise:
   calculating, during the calculating distortion values for each one of the candidate motion vectors, distortion values by taking a sum of absolute differences or a sum of squared differences pixel values in the template area of the current block and pixel values in the reference block template area, and
   selecting, during the obtaining the motion vector for the current block, the candidate motion vector, of the set of candidate motion vectors, having a minimum sum of absolute differences or a minimum sum of squared differences of pixel values as a best matching motion vector.

6. An encoding method, comprising:
   searching for and determining a encoded motion vector of a current encoded block by using the rapid motion search method applied in template matching according to claim 1; and
   encoding the current encoded block according to the encoded motion vector obtained for the current encoded block.

7. A decoding method, comprising:
   searching for and determining a decoded motion vector of a current decoded block by using the rapid motion search method applied in template matching according to claim 1; and
   decoding the current decoded block according to the decoded motion vector obtained for the current decoded block.

8. An apparatus for a rapid motion search for a current block within a current frame, applied in template matching, for motion compensation prediction of the current block with respect to a reference frame, comprising:
   a candidate motion vector determining unit, configured to generate, for the current block, a set of candidate motion vectors from motion vectors of blocks related to the current block; and a motion vector searching unit, configured for:

calculating, by template matching for each one of the set of candidate motion vectors, a distortion value calculated from differences between pixel values in a template area for the current block and pixel values in a reference block template area within the reference frame, corresponding to a respective one of the candidate motion vectors, wherein each one of the set of candidate motion vectors specifies a displacement, of a position of the template area for the current block within the current frame, to render a position of the reference block template area within the reference frame to which corresponding pixel values of the template area for the current block are compared to calculate the distortion value for the one of the set of candidate motion vectors, and wherein the template area for the current block is a rotated L-shaped area bounded by a top edge and a left edge of the current block within the current frame, the calculating rendering a set of distortion values corresponding to respective ones of the set of candidate motion vectors; and obtaining, from the set of distortion values for the set of candidate motion vectors, a motion vector prediction for the current block, wherein the motion vector prediction for the current block corresponds to the respective one of the set of candidate motion vectors for which a minimum distortion value of the set of distortion values was rendered during the calculating.

9. The apparatus according to claim 8, wherein the motion vectors of blocks related to the current block comprise motion vectors of at least one of the group consisting of:

motion vectors of blocks spatially related to the current block, wherein the blocks spatially related to the current block are blocks adjacent to the current block; and blocks temporally related to the current block, wherein the blocks temporally related to the current block refer to the blocks corresponding to or adjacent to the current block in the reference frame.

10. The apparatus according to claim 8, wherein: the set of candidate motion vectors of the current block are different from each other, and the set of candidate motion vectors determined by the candidate motion vector determining unit comprise at least one of:

a motion vector corresponding to a single block related to the current block;

motion vectors obtained by calculating one or more motion vectors corresponding to one or more blocks related to the current block; or a motion vector selected from multiple motion vectors corresponding to multiple blocks related to the current block.

11. The apparatus according to claim 10, wherein the generating the set of candidate motion vectors comprises at least one of the group consisting of:

performing a scaling calculation for the motion vectors of one or more blocks related to the current block according to reference image indexes of the current block and reference image indexes of the blocks related to the current block;

performing a shift calculation for the motion vectors of one or more blocks related to the current block;

performing a median calculation for the motion vectors of multiple blocks related to the current block; and performing a weighted average calculation for the motion vectors of multiple blocks related to the current block.

12. The apparatus according to claim 8, wherein the motion vector searching unit comprises:

a calculating unit, configured to calculate, during the calculating distortion values for each one of the candidate motion vectors, distortion values by taking a sum of absolute differences or a sum of squared differences between pixel values in the template area of the current block and pixel values in the reference block template area, and a motion vector determining unit, configured to select, during the obtaining the motion vector for the current block, the candidate motion vector, of the set of candidate motion vectors, having a minimum sum of absolute differences or a minimum sum of squared differences of pixel values according to the calculation result of the calculating unit.

13. An encoder, comprising the apparatus for the rapid motion search applied in template matching according to claim 8, and an encoding unit configured to encode a current encoded block according to a motion vector of the current encoded block obtained by the apparatus for the rapid motion search applied in template matching.

14. A decoder, comprising the apparatus for the rapid motion search applied in template matching according to claim 8, and a decoding unit configured to decode a current decoded block according to a motion vector of the current decoded block obtained by the apparatus for the rapid motion search applied in template matching.

15. A computer-readable medium having computer usable instructions stored thereon for execution by a processor to perform a method for conducting a rapid motion search for a current block within a current frame, using template matching, for motion compensation prediction of the current block with respect to a reference frame, the method comprising:

generating, for the current block, a set of candidate motion vectors from motion vectors of blocks related to the current block;

calculating, by template matching for each one of the set of candidate motion vectors, a distortion value calculated from differences between pixel values in a template area for the current block and pixel values in a reference block template area within the reference frame, corresponding to a respective one of the candidate motion vectors, wherein each one of the set of candidate motion vectors specifies a displacement, of a position of the template area for the current block within the current frame, to render a position of the reference block template area within the reference frame to which corresponding pixel values of the template area for the current block are compared to calculate the distortion value for the one of the set of candidate motion vectors, and wherein the template area for the current block is a rotated L-shaped area bounded by a top edge and a left edge of the current block within the current frame, the calculating rendering a set of distortion values corresponding to respective ones of the set of candidate motion vectors; and obtaining, from the set of distortion values for the set of candidate motion vectors, a motion vector prediction for the current block, wherein the motion vector prediction for the current block corresponds to the respective one of the set of candidate motion vectors for which a minimum distortion value of the set of distortion values was rendered during the calculating.

* * * * *